(12) United States Patent
Bhattacharya et al.

(10) Patent No.: US 8,122,123 B2
(45) Date of Patent: Feb. 21, 2012

(54) SYSTEM AND METHOD FOR MONITORING BUSINESS PERFORMANCE USING MONITORING ARTIFACTS

(75) Inventors: Kamal Bhattacharya, New York City, NY (US); Shubir Kapoor, Shrub Oak, NY (US); Santhosh Kumaran, Peekskill, NY (US)

(73) Assignee: International Business Machines Corporation, Armonk, NY (US)

(*) Notice: Subject to any disclaimer, the term of this patent is extended or adjusted under 35 U.S.C. 154(b) by 652 days.

(21) Appl. No.: 11/678,292

(22) Filed: Feb. 23, 2007

(65) Prior Publication Data

US 2008/0209029 A1    Aug. 28, 2008

(51) Int. Cl.
*G06F 15/16* (2006.01)
*G06Q 10/00* (2006.01)

(52) U.S. Cl. .......... 709/224; 705/7.36; 705/7.38

(58) Field of Classification Search .......... 709/203, 709/204, 224, 225; 705/1, 2, 7, 8, 38, 7.11, 705/7.36, 7.38; 718/104; 700/100
See application file for complete search history.

(56) References Cited

U.S. PATENT DOCUMENTS

| | | | |
|---|---|---|---|
| 6,665,648 B2 * | 12/2003 | Brodersen et al. | 705/7 |
| 6,763,353 B2 * | 7/2004 | Li et al. | 707/4 |
| 6,868,401 B1 * | 3/2005 | Carpenter et al. | 705/37 |
| 7,170,993 B2 * | 1/2007 | Anderson et al. | 379/265.09 |
| 2004/0078105 A1 * | 4/2004 | Moon et al. | 700/100 |
| 2004/0220845 A1 * | 11/2004 | Malapitan | 705/8 |
| 2005/0091093 A1 * | 4/2005 | Bhaskaran et al. | 705/7 |
| 2008/0005743 A1 * | 1/2008 | Kraft et al. | 718/104 |

\* cited by examiner

*Primary Examiner* — Jungwon Chang
(74) *Attorney, Agent, or Firm* — Daniel P. Morris; McGinn IP Law Group, PLLC

(57) ABSTRACT

A method (and system) of monitoring business performance using a monitoring artifact includes processing an incoming event using the monitoring artifact.

14 Claims, 12 Drawing Sheets

SYSTEM AND METHOD FOR MONITORING BUSINESS PERFORMANCE USING MONITORING ARTIFACTS

BACKGROUND OF THE INVENTION

1. Field of the Invention

The present invention generally relates to a system and a method for monitoring business performance. In particular, the present invention is directed to a method and a system for monitoring business performance using monitoring artifacts.

2. Description of the Related Art

For an enterprise to be competitive, the business processes for the enterprise needs to constantly evolve to keep up with rapid changes in a business environment and to continuously service the information needs of the employees, the customers, and the trading partners of that enterprise. In order to satisfy these needs an enterprise requires in-depth visibility, monitoring, and management routines across all its business processes.

Conventional business process monitoring approaches are often focused on an after-the-fact reporting approach or an event-driven approach. The reporting approach requires the business process to publish pertinent information into a database or data warehouse and uses queries against the data. The queries are designed based on the calculations that are required for performance parameters that will be considered. This is a static analysis approach that does not take into account the dynamic nature of a business and is not well suited for real-time monitoring.

Event-based monitoring systems receive and correlate live events that are published in the course of a business process. This approach retains some of the dynamic aspects of the business process and attempts to enable real-time monitoring. The correlation of events realizes the calculation of performance metrics. The realization of the correlation technology is usually rule based. Conventional event based systems resolve dynamic aspects of business processes, but typically ignore the static aspects and, hence, are less suitable for reporting.

Conventional monitoring systems are often designed either in a static or event-based way where static systems incorporate dynamic features by frequently checking for updates on the databases to query for new entries. Event-based solutions incorporate the data aspect by providing additional solution modules outside of the scope of event management that allow for static reporting abilities.

SUMMARY OF THE INVENTION

In view of the foregoing and other exemplary problems, drawbacks, and disadvantages of the conventional methods and structures, an exemplary feature of the present invention is to provide a method and structure in which both static and dynamic aspects of monitoring are comprised within one holistic concept that enables both reporting and event based monitoring.

In a first exemplary aspect of the present invention, a method of monitoring business performance using a monitoring artifact includes processing an incoming event using the monitoring artifact.

In a second exemplary aspect of the present invention, a system for monitoring business performance using a monitoring artifact includes a process model that indicates the state of a monitoring process, an information model that comprises at least one root data element containing an indicator of the state of the monitoring process, and an access model that determines the access for at least one user to the monitoring artifact.

In a third exemplary aspect of the present invention, a system of monitoring business performance using a monitoring artifact includes means for processing an incoming event using the monitoring artifact.

An exemplary embodiment of the present invention is a system and method for monitoring business performance using monitoring artifacts.

An exemplary embodiment of the present invention monitors business processes. For example, a performance indicator may be defined which measures an aspect of how a business process performs during execution. One example of a business process is a shipping process where tender is shipped from a supplier to a receiver via a warehouse owned by a seller. An example of a performance indicator may be a turnaround time which describes the time needed to ship the tender from the supplier warehouse to the receiver. Another example of a performance metric may be how many goods are shipped during any given day.

A challenge is to monitor the shipped goods as they move through different locations. The user of monitoring information could be a seller that is interested in the statistics of good throughput and average turn around times or an end consumer who wants to know the current location of an ordered good to estimate its time of arrival.

In this example, there is a focus on the business process of the seller that includes the goods shipped out from the supplier's side, transported to the seller's warehouse, and shipped out to the end consumer of the goods. The steps in the business process could include registering the goods through a scanner at the original location, uploading the goods onto the truck, registering the goods upon arrival at the seller's warehouse, off-loading the goods and shelving the goods in the seller's warehouse, register the goods for shipment to the end-consumer, off-loading the goods from the shelves and upload the truck, and finally registering the goods upon arrival at the end consumers location.

In this example there may be two monitoring approaches, a static monitoring approach based on data in a data warehouse and an event based real-time monitoring approach. Performance metrics for this example may include the average turn around time and the average number of goods shipped per day.

An exemplary embodiment of the present invention considers the monitoring of the shipment process as another process. This conceptual view is manifested through the use of monitoring artifacts, which will be described in detail below. Monitoring the business process as described above requires an understanding of performance indicators that are calculated using data generated by business processes, and an understanding of the monitoring process. Furthermore, it is necessary to understand the access that business actors use to monitor information. For example, a customer may be interested in the current location whereas a business manager may be interested in the average throughput of the goods. Each of these actors needs access to different monitoring information.

An exemplary logical model of the invention may contain three parts as described in more detail below, an information model, a life-cycle model, and an access model.

An exemplary information model captures all information that is pertinent to the monitoring context. That is, an information model contains information that describes what results are produced by the monitoring process and what information is employed to produces these results.

An exemplary life-cycle model defines monitoring tasks that act upon information in the information model. The life-cycle model may describe tasks that include a group of elements such as, for example, "Correlate events and calculate indicators", "Evaluate results", "Detect Business Situations", "Act" and "Completed". These elements represent the states of the monitoring artifact. A life-cycle model can be represented using any appropriate scheme such as, for example, a state-machine model, a Petri-net model, or similar models. A life-cycle model may provide the overall processing steps of a monitoring artifact. Each task in a life-cycle model may spawn off another process such as, for example, a process that correlates events.

An exemplary access model may define access by actors to information in the information model. This aspect may be defaulted by allowing access to anyone who is interested in the monitoring information. Alternatively, access may be restricted based upon the role of an actor using standard role-based access control lists.

For the shipping example, consider an analyst who conceptualizes how to monitor the shipping process. There are three aspects to be analyzed. First, what is the information that is needed to calculate performance indicators for the business process? For example, the shipment of goods may be monitored by tracing the location of each good. The shipment label typically identifies each good uniquely. Hence, the information required to monitor a specific unit is its identification and potentially a name. Furthermore, the monitoring process may also collect time stamps for each location change, such as, for example, when the unit has either left or arrived at a location. Finally, there may be a need to capture the information that relates to the results of the monitoring process, such as, for example, turn-around time per process, per day etc. or number of goods shipped. All of this information may be captured in a logical information model.

Second, the information captured above may be processed to produce monitoring results. Typical steps of a monitoring operation include a group of tasks such as, for example, a correlation of monitoring events, an analysis of performance indicator values, and actions that can be taken depending on the results for the performance indicators. In the shipping example, the events that are published by the business process, such as "good shipped at time t" are correlated to each other. Further, performance indicators may be evaluated and business situations may be detected, such as a performance indicator being over a certain threshold. Actions may be defined to be taken if a business situation arises. These different tasks may specify the operations that work on the information captured in the monitoring artifact information.

Within each of these tasks, an exemplary embodiment of a system of the invention may specify the processing of events and calculated information. For example, when an event indicates that an item has been shipped a process, the system may calculate the turn-around time of this item when another event indicates that the shipment has arrived at a destination. This calculation is a correlation between the two events. This may be expressed as one of many representations such as a state machine or a business process or a rule-based correlation mechanism or other. The calculation of the performance indicator turn-around time may be executed at the end of the correlation and stored in an information table.

The operations that are defined in a monitoring artifact determine when a correlation, such as, for example, the calculation of the average turn-around time, will occur. For example, the system may specify that the turn-around time will be calculated at the end of each business day, every hour, or the like. Depending on this definition, the monitoring artifact will move into an evaluation state and calculate the turn around time for all entries in its information table.

After an evaluation has been completed, the average turn-around time may be compared against a threshold to detect if there are any situations that could trigger an action. For example, the system may determine whether the average turn around time has increased over the last two weeks and, if so, the system may alert a business manager who may need to intervene.

A third aspect of an exemplary monitoring artifact may be concerned with information access. The information defined in the context of a monitoring artifact may contain results from the correlation between events from the business process, and the detection of business situations. There may be different users who are interested in different types of this information. For example, a business manager of a seller may be interested in all of the information related to a monitoring artifact, while an end-consumer should not access turn-around times for shipments. Thus, the access model of the monitoring artifact may determine the access provided to these different actors.

An exemplary embodiment of a monitoring artifact may contain all three aspects as described above.

An exemplary embodiment of the present invention provides several advantages over conventional systems. First, conventional monitoring approaches take a static view to monitoring rather than considering monitoring as a process. An exemplary embodiment of the present invention provides the insight that monitoring may be conceptualized as a business process and also provides the logical architecture for a monitoring environment that supports state-full monitoring processes.

Second, conceptualizing and implementing monitoring as a process entails the benefits of process-centric approaches. For example, several versions of a key performance indicator evaluation process may be deployed at the same time.

Third, a monitoring artifact may represent a process that can be changed over time. Hence, monitoring artifacts may allow for dynamic evolution of key performance indicators.

Fourth, one goal of business process monitoring is to react to situations in an appropriate way. If a business process has a key performance indicator that is outside of a desired range of values, then there may be actions that could help rectify the situation beyond simply sending an alert. For example, if a warehouse has an inventory control system that allows for automatic replenishment of inventory if the stocks go beyond a certain threshold, a business situation analysis could potentially invoke a warehouse control system if such a situation is detected.

In contrast to conventional systems and methods for monitoring, the inventors have invented an entirely new paradigm which views monitoring processes as being dynamic rather than static and yet allows for static analysis as the monitoring artifact captures all information that is pertinent to the monitoring context under consideration (for example, monitoring of shipments). This new paradigm enables a much wider range of control over the underlying business processes than has conventionally been available.

For example, the conventional static view of monitoring processes have led to an approach where certain aspects of a business process are selected for monitoring and data about those aspects are collected. This approach would neglect the real-time aspect of a business process.

An exemplary embodiment of the present invention defines a monitoring artifact as a model, which may be represented in any readable representation such as, for example, extensible markup language. The monitoring artifact model can be executed by a run-time similar to any business process management run-time that allows the execution of state-managed processes.

An exemplary embodiment of the present invention enables the selection, identification, and/or determination of an appropriate action that should be taken in response to such information. Typically business actions to rectify potential critical business situations, such as, for example, low stock, high turn-around times, etc. are defined as business processes. A monitoring artifact in accordance with the present invention may measure the performance of a business process and based on an analysis of the business situation may trigger another business process that performs a compensatory action, such as, for example, ordering new goods for replenishment. This is a concept provided by the present invention that lacks in conventional monitoring static and event based approaches.

An exemplary embodiment of the present invention may be applied to multiple business processes and may improve the operation of multiple business processes and to improve the interaction between multiple business processes.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
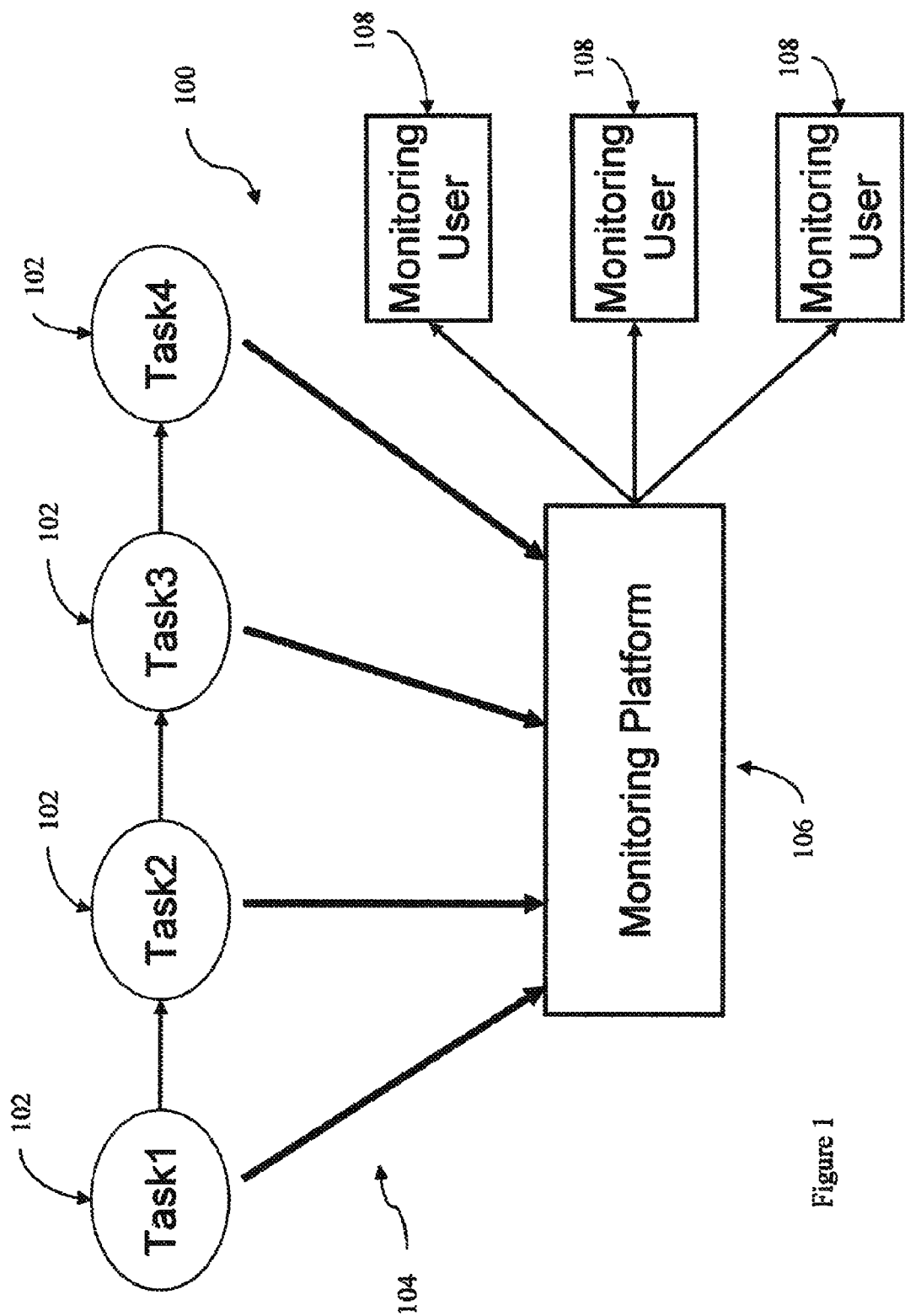
FIG. 1 illustrates one exemplary monitoring scenario 100 in accordance with the present invention.

Referring now to the drawings, and more particularly to FIGS. 1-12, there are shown exemplary embodiments of the method and structures of the present invention.

FIG. 1 illustrates one exemplary monitoring scenario 100 for an exemplary embodiment of this invention. A business process may include a series of tasks 102 which may each emit a business event 104 that is received by a monitoring platform 106.

The monitoring scenario 100 also illustrates multiple monitoring users 108. A monitoring user 108 may be interested in the key performance indicators that are provided by the monitoring platform 106. For example, a monitoring user 108 may be a business user who has an interest in the performance of the business processes. These monitoring users 108 may even be outside the business process integration infrastructure. The monitoring user 108 may also be another business process.

The monitoring platform 106 provides a run-time environment upon which monitoring artifacts (described below) may be executed.

Figure 2:
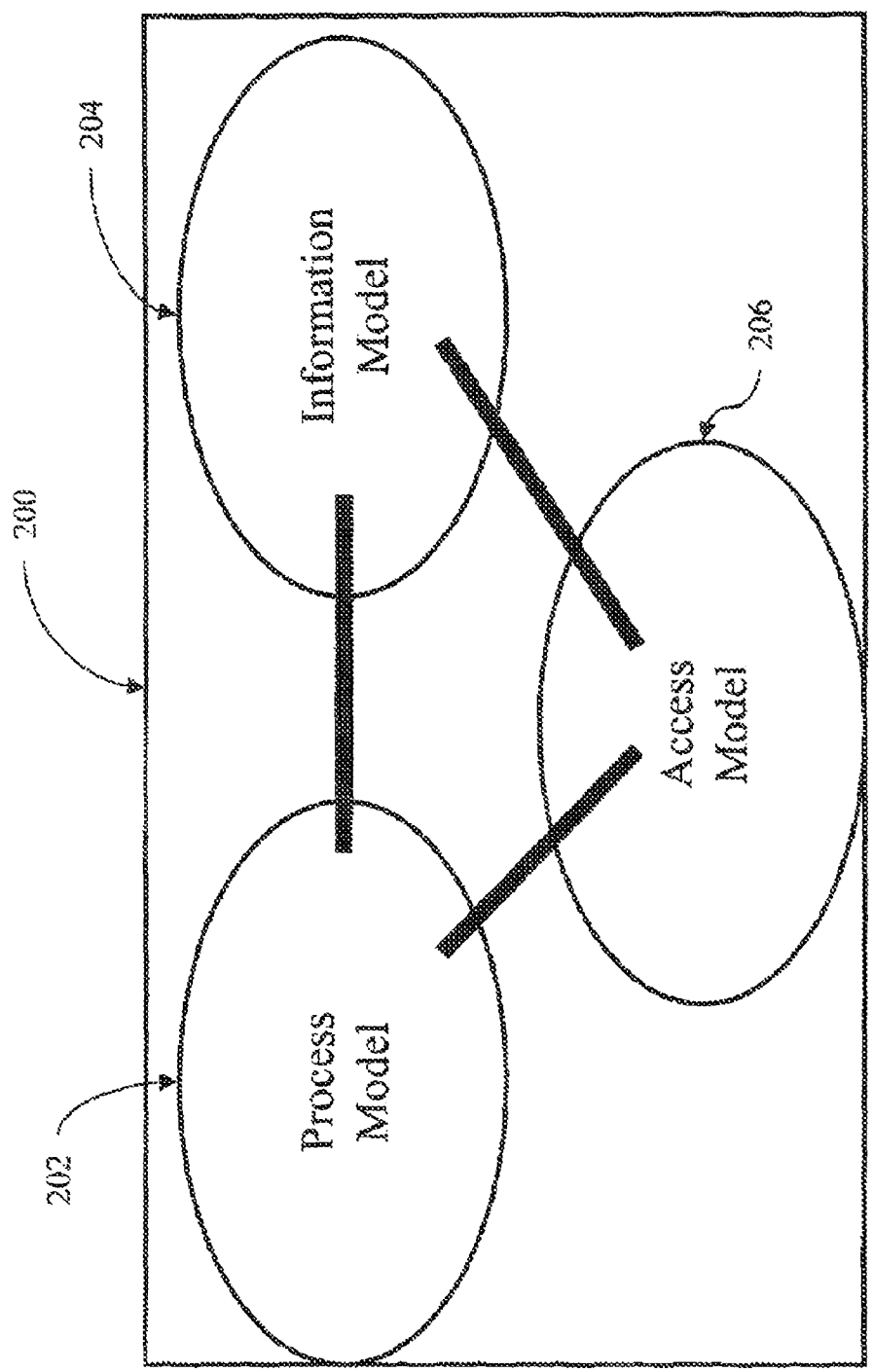
FIG. 2 illustrates an exemplary structure for a monitoring artifact 200 in accordance with the present invention.

FIG. 2 illustrates an exemplary structure of a monitoring artifact 200. The monitoring artifact 200 includes a process model 202, an information model 204, and an access model 206. The information model 204 may represent information that is needed for current monitoring information and historical data. The process model 202 may describe processes that are performed by the monitoring artifact, such as, calculations, alerts, correlations, and the like. The access model 206 determines the access that is provided by monitoring users 108 to the monitoring artifact.

Figure 3:
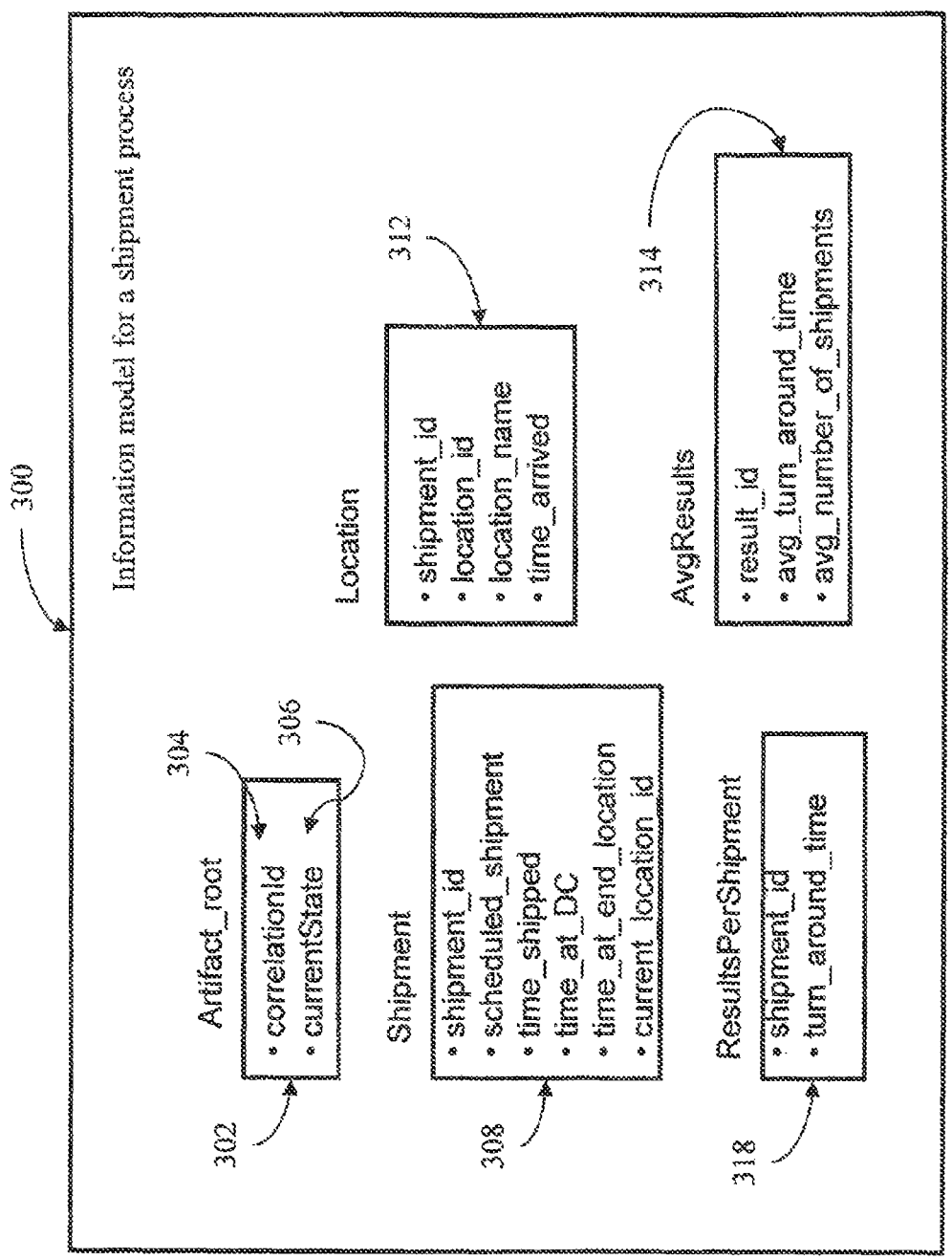
FIG. 3 illustrates an exemplary information model 300 in accordance with the present invention.

FIG. 3 illustrates an exemplary information model 300 for the shipping example described above. The information model 300 contains a root table called "Artifact_root" 302 that contains two entries. The root table 302 includes a "correlationId" element 304, which identifies an instance of the monitoring artifact, and a "currentstate" element 306, which identifies a state of the monitoring artifact. The information model 300 also contains a "Shipment" table 308, a "ResultsPerShipment" table 310, a "Location" table 312, and an "AvgResults" table 314. These other tables describe information that may be relevant to the monitoring scenario. The "Shipment" table 308 includes, for example, the time the shipment left the supplier ("time_shipped" 316, and the time the shipment reached the distribution center ("time_at_DC" 318), and the like.

Figure 4:
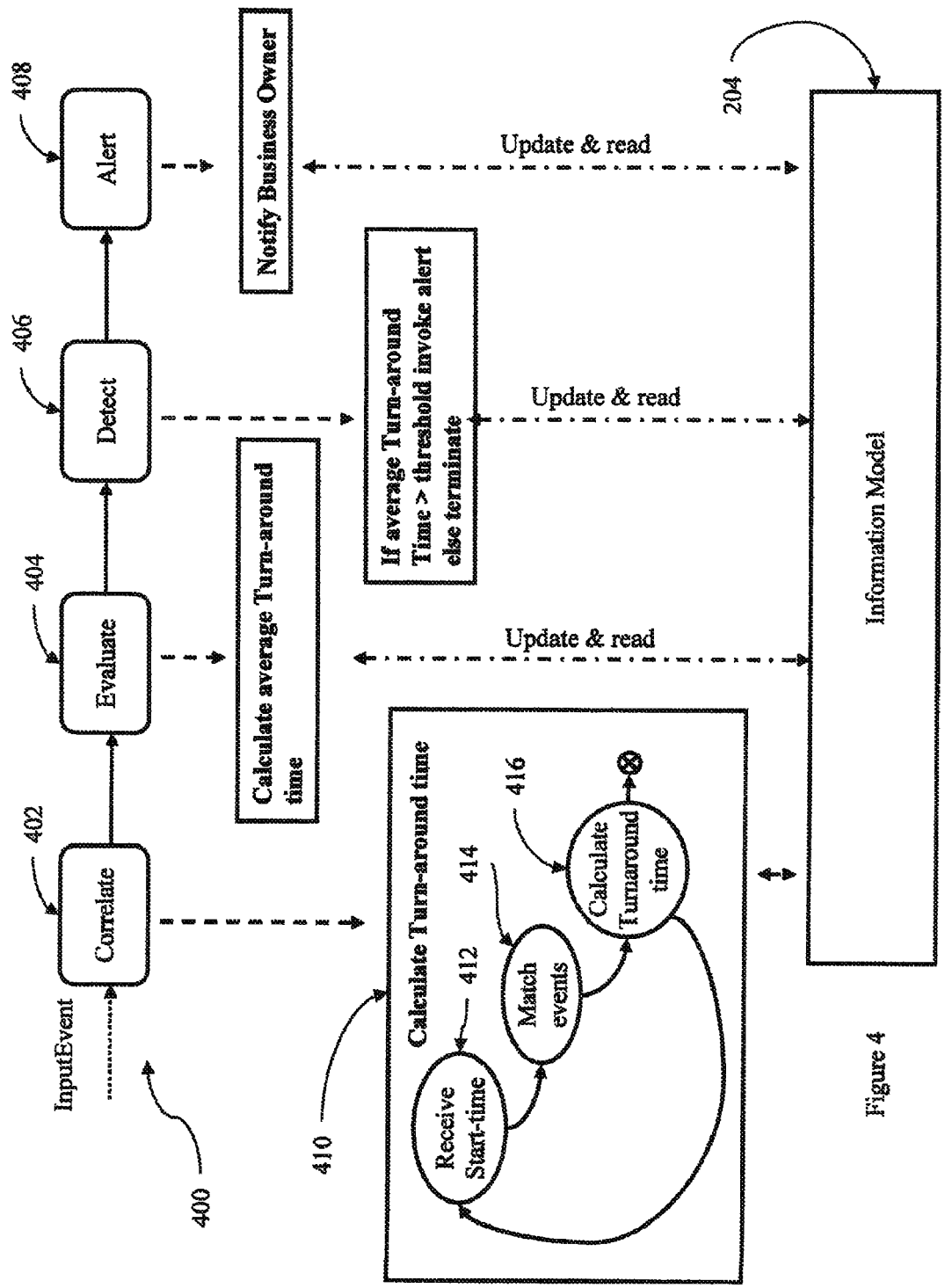
FIG. 4 illustrates an exemplary process model 400 in accordance with the present invention.

The process model 202 describes processes by which events 104 may be aggregated, evaluated, define key performance indicators, analyzed, and checked for situation violations. An exemplary process model 400 is illustrated by FIG. 4. The process model 400 includes a correlate process 402, an evaluate process 404, a detect process 406, and an alert process 408. In FIG. 4, the process model 400 starts with a correlate process 402 which receives business events 104 ("InputEvent") that are stored in the information model 204 and that correlates these events 104 to each other. The correlate process 402 may determine performance indicates such as, for example, a number of incoming requests, turn-around times, and the like. FIG. 4 illustrates an exemplary correlate process 402 which may include a process which calculates a turn-around time as illustrated at 410. The turn-around calculation process 410 may receive a start-time 412 that indicates that the process is to be started, may then match events that are stored by the information model at 414, and may then continue to step 416, where the turn around time is calculated.

The process model 400 also includes an evaluate process 404. An evaluate process 404 may be triggered. For example, an evaluate process 404 may be triggered to calculate an average turn-around time after the correlate process 402 calculates a predetermined number of turn around times.

Next, the process model 400 includes a detect process 406. A detect process 406 may detect whether predetermined contingencies have been satisfied. For example, the detect process 406 may detect whether or not the average turn-around is greater than a predetermined threshold. The detect process 406 may also determine if a performance indicator is outside of defined boundaries.

The process model 400 also includes an alert process 408 which may be triggered based upon the detection of a contingency by the detect process 406. For example, if the detect process 406 determines that the average turn-around is greater than a predetermined threshold, then the alert process 408 may issue an alert, such as, for example, notify a business owner of the detected event.

FIG. 4 further illustrates that the results of each process 402-408 may be stored in the information model 204.

Figure 5:
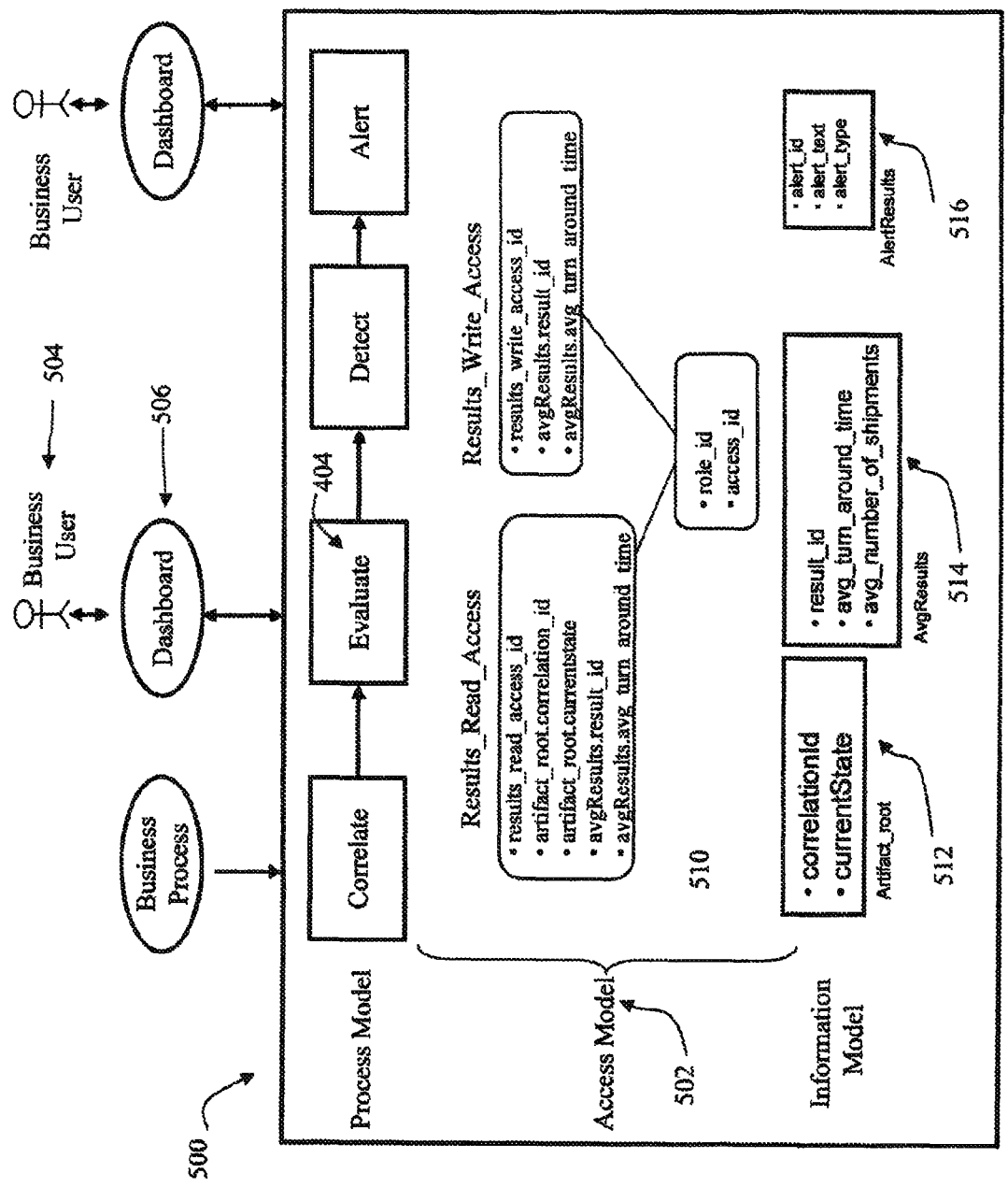
FIG. 5 illustrates an exemplary access model in accordance with the present invention.

An access model for a monitoring artifact in accordance with the present invention may describe the access that users may have to the monitoring artifact as well as the interface with which a user accesses the monitoring artifact. An exemplary access model 402 for a monitoring artifact 500 is illustrated by FIG. 5. As shown in FIG. 5 a business user 504 can look at the data that was generated during the evaluation process 404, e.g. average turn-around time. The business user 504 typically accesses the system through a dashboard 506. The dashboard 506 is not part of the modeling environment but is only shown as conceptualization to illustrate the importance of access models. In this example, the case that a business user 504 has access to the monitoring artifact root information table 512 and the table that stores the average turn around time 514 is modeled. To realize this scenario, the access model 502 specifies what the business user can read using the "Results_Read_Access" table 510.

The monitoring artifact 500 provides an external (public) interface exposing operations that can be invoked on the monitoring artifact 500. Furthermore, it exposes all of the operations that may read and update information to the monitoring artifact 500, as specified through the monitoring views. The read and update mechanism is exemplified in FIG. 5 that illustrates an exemplary access model 502.

The access model 502 specifies that a user of the monitoring artifact 500 can read, for example, "correlation_id" and "currentState" the "Artifact_root" table 512 and additionally "result_id" and "avg_turn_around_time" from the "AvgResults" table 514.

Figure 6:
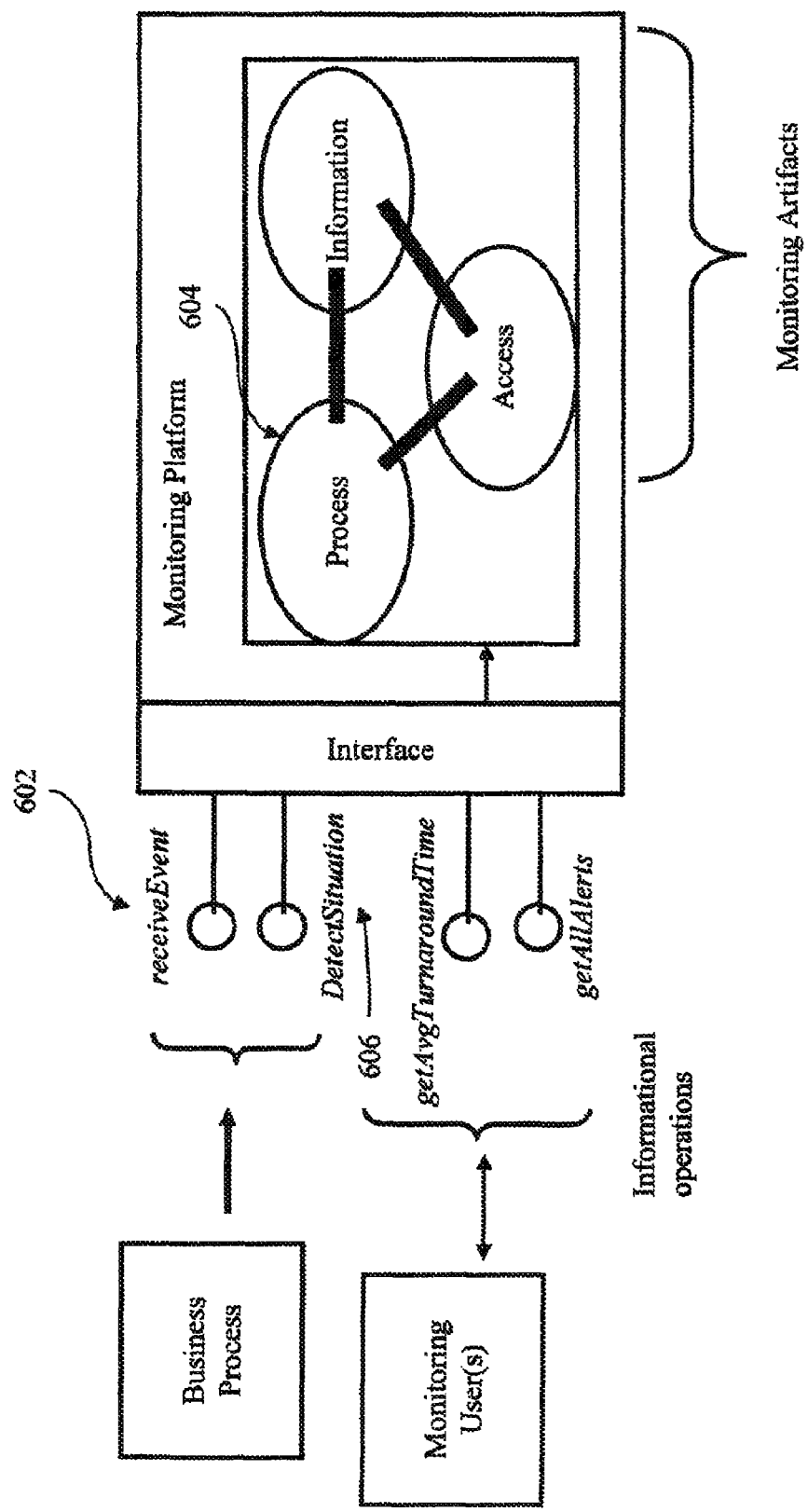
FIG. 6 illustrates a two exemplary events in accordance with an exemplary embodiment of the present invention.

An external client (not shown) to a monitoring artifact may send events that will drive the behavior of the monitoring artifact as described in the monitoring process model. FIG. 6 shows an example of two events. A "receiveEvent" event 602 triggers a correlation process of the process model 604 and a "DetectSituation" event 606 moves the monitoring process 604 into a detect state.

Figure 7:
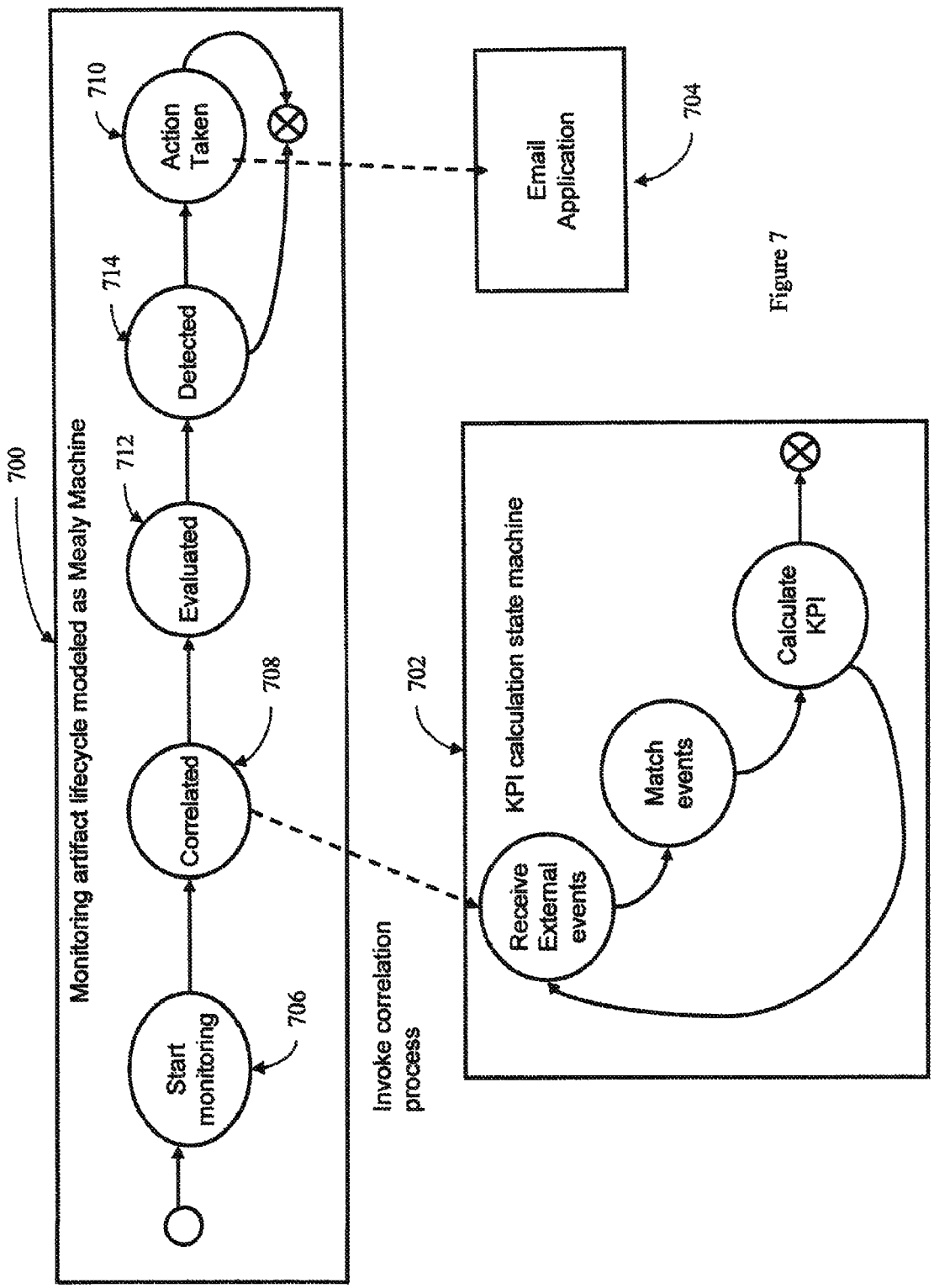
FIG. 7 illustrates an exemplary process model 700 as a state machine in accordance with the present invention.

A process model may control the state of the monitoring artifact and defines the basic tasks and flow of a monitoring artifact. FIG. 7 illustrates a process model 700 as a state machine. The process model 700 integrates a key performance calculation state machine 702 as a correlation process 708 and an email application 704 as an alert process 710. The transition for moving from the "start monitoring" process 706 to the correlation process 708 invokes the key performance calculation state machine 702 to calculate a turn-around key performance indicator.

Figure 8:
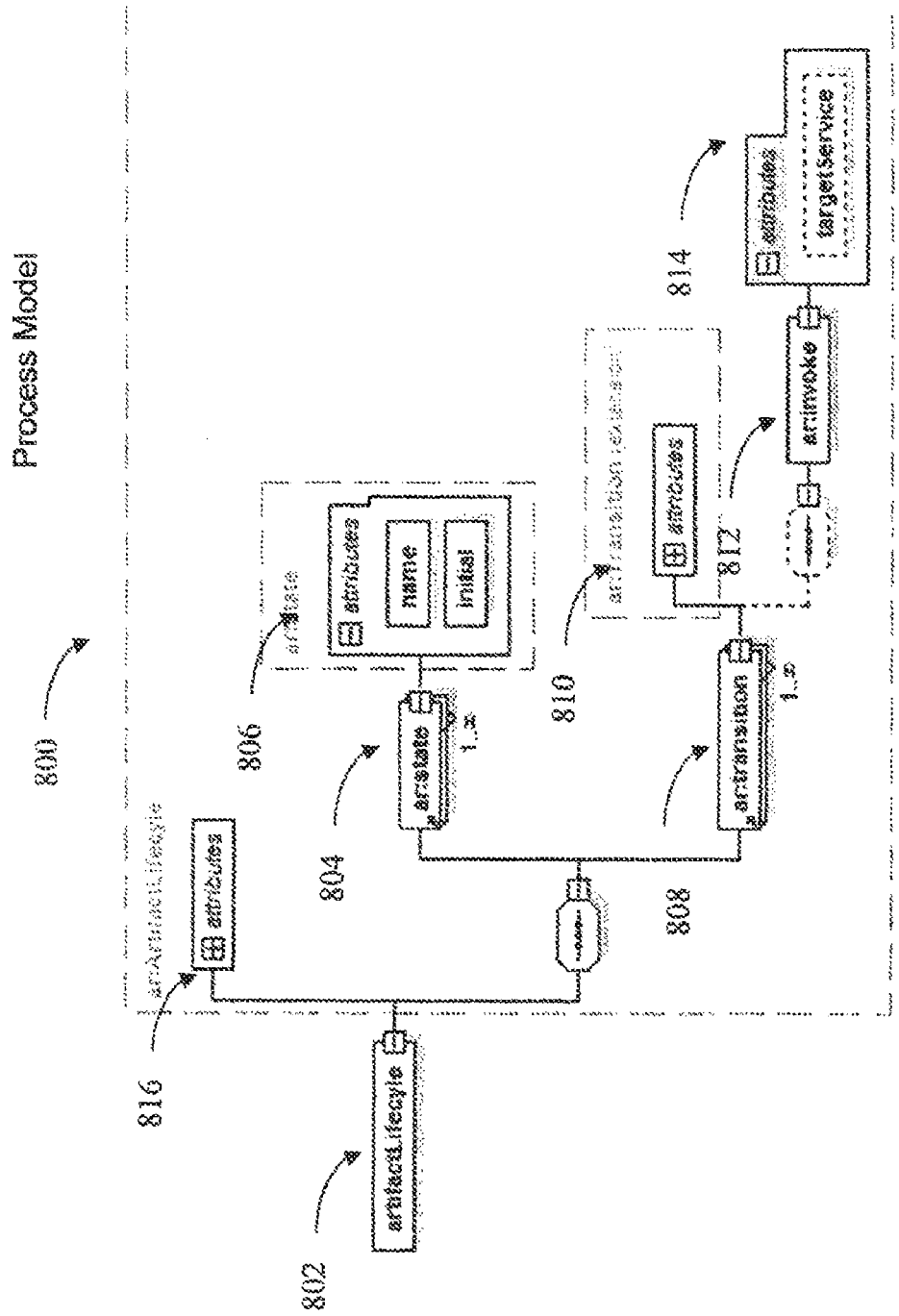
FIG. 8 illustrates an exemplary meta-model 800 for a process model in accordance with the present invention.

FIG. 8 shows an exemplary meta-model for a process model 800 using an extensible markup language in accordance with the present invention. The exemplary model 800 uses a finite state machine abstraction to describe a process. The root element of the meta model 800 is "artifactLifecycle" element 802. The "artifactLifecyle" element 802 contains a state element 804 which is described by a name attribute 806 and an initial attribute 818 to indicate if this state is a start state of the process. The state element 804 further contains a transition element 808 which models the transition between states. The attributes 810 of the transition element 808 declare the start and the end state for the transition. An external service may optionally be invoked on the transition as declared by an invoke element 812. The service to be invoked may be described by a "targetService" attribute 814. The root element 802 can also contain a descriptive attribute 816. An exemplary instance of the meta-model 800 is shown in FIG. 7. The states are "Start Monitoring" 706, "Correlated" 708, "Evaluated" 712, "Detected" 714 and "Action Taken" 710. The transition from "Start Monitoring 706" to "Correlated" 708 would invoke a target service 702 to perform the KPI calculation as described above.

Figure 9:
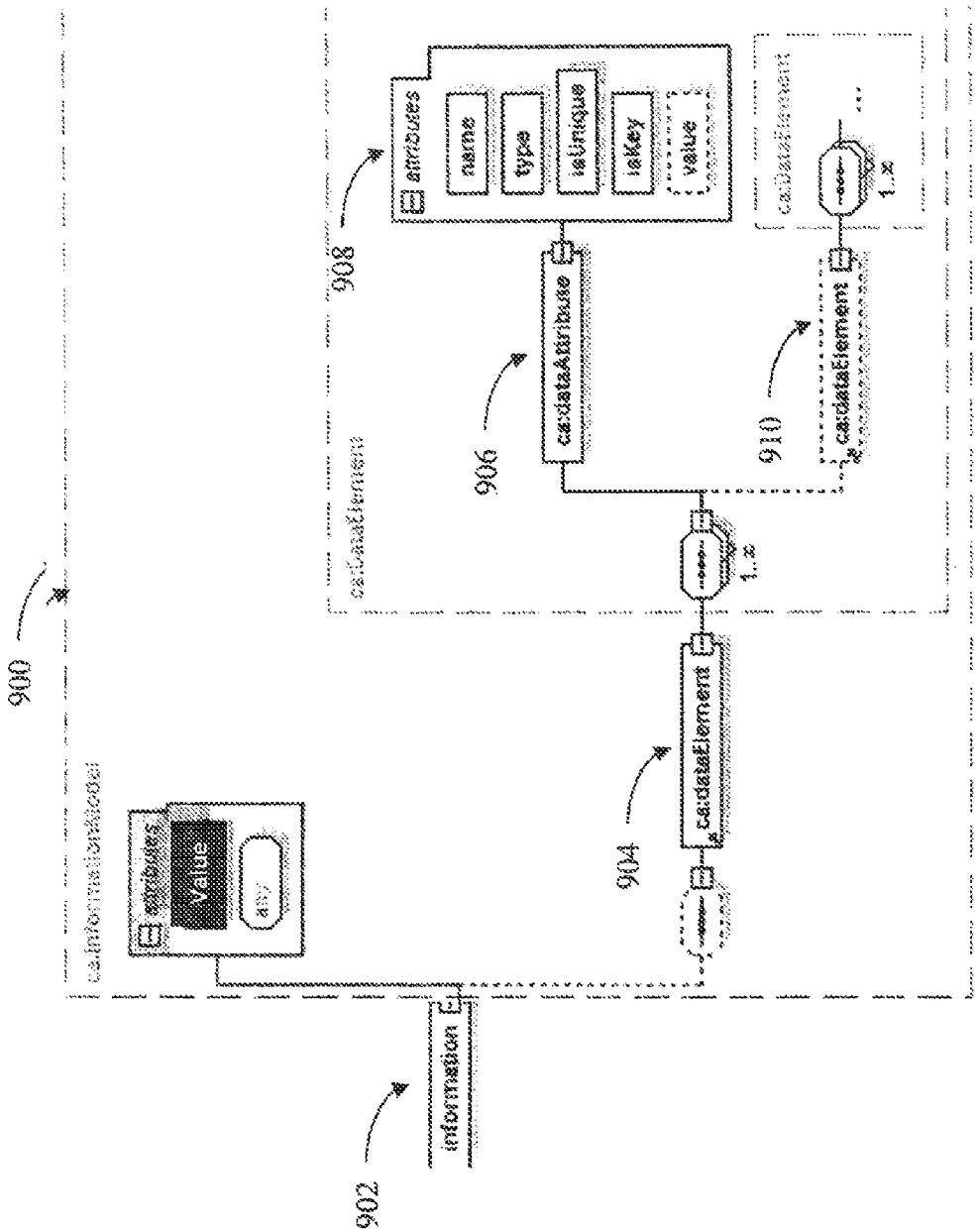
FIG. 9 illustrates an exemplary information schema meta-model 900 in accordance with the present invention.

An exemplary information model in accordance with the present invention represents data that is pertinent to one or many monitoring artifacts. FIG. 9 shows an exemplary information schema meta-model 900.

The element "information" 902 is the root of the meta-model 900. It contains an element "dataElement" 904, which describes a collection of data attributes 906, where each data attribute 906 is described by attributes 908 such as, for example, name, type, uniqueness, etc. The "dataElement" element 904 contains "dataElement" 910 which allows the creation hierarchical information models.

An instance of this model 900 is illustrated in FIG. 3. An instance of root element information 902 is expressed as the information model 300. An example of a "dataElement" 904 is "Shipment" 316, which contains "dataAttributes" 906 such as "shipment_id," "scheduled_shipment", etc.

The source and location of the information is not specified in the information model. The source and location of the information can be data bases, flat files, applications, etc.

Figure 10:
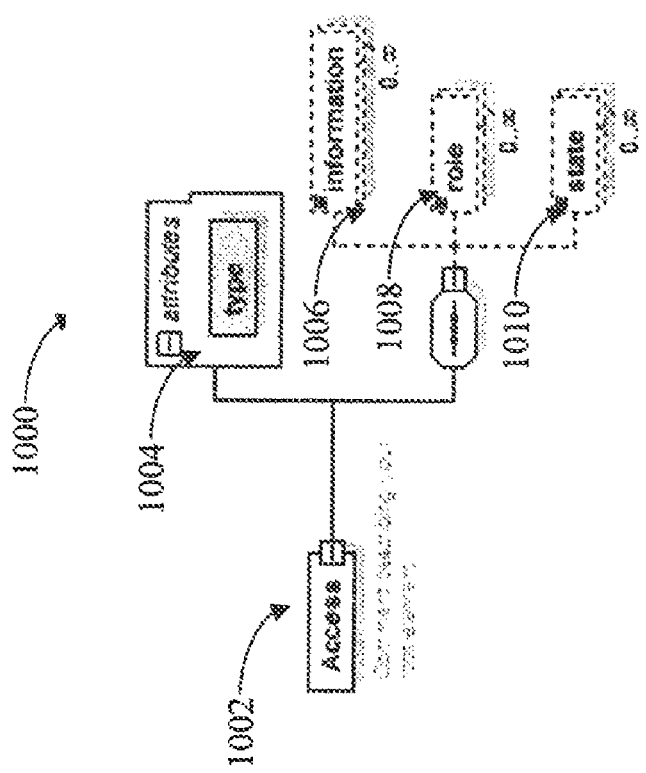
FIG. 10 illustrates an exemplary meta-model 1000 for an access model in accordance with the present invention.

The access model may describe what part of the monitoring artifact is exposed to the consumers of the information who are participating in the course of one or many monitoring processes. FIG. 10 shows an exemplary meta-model 1000 for an access mode. The root "Access" 1002 contains a "type" attribute 1004 that describes whether the access model 1000 is for read or write access. Furthermore, the "Access" root 1002 optionally contains a reference to an information element 1006 which is explained above in reference to FIG. 9 and specifically element information 902. To model the role which accesses information, the access model 1000 may contain multiple "role" attributes 1008. Further, a "state" element 1010 corresponds to the state 804 which is described above with respect to FIG. 8. The "state" element 1010 may restrict access based upon the state of the monitoring artifact.

Figure 11:
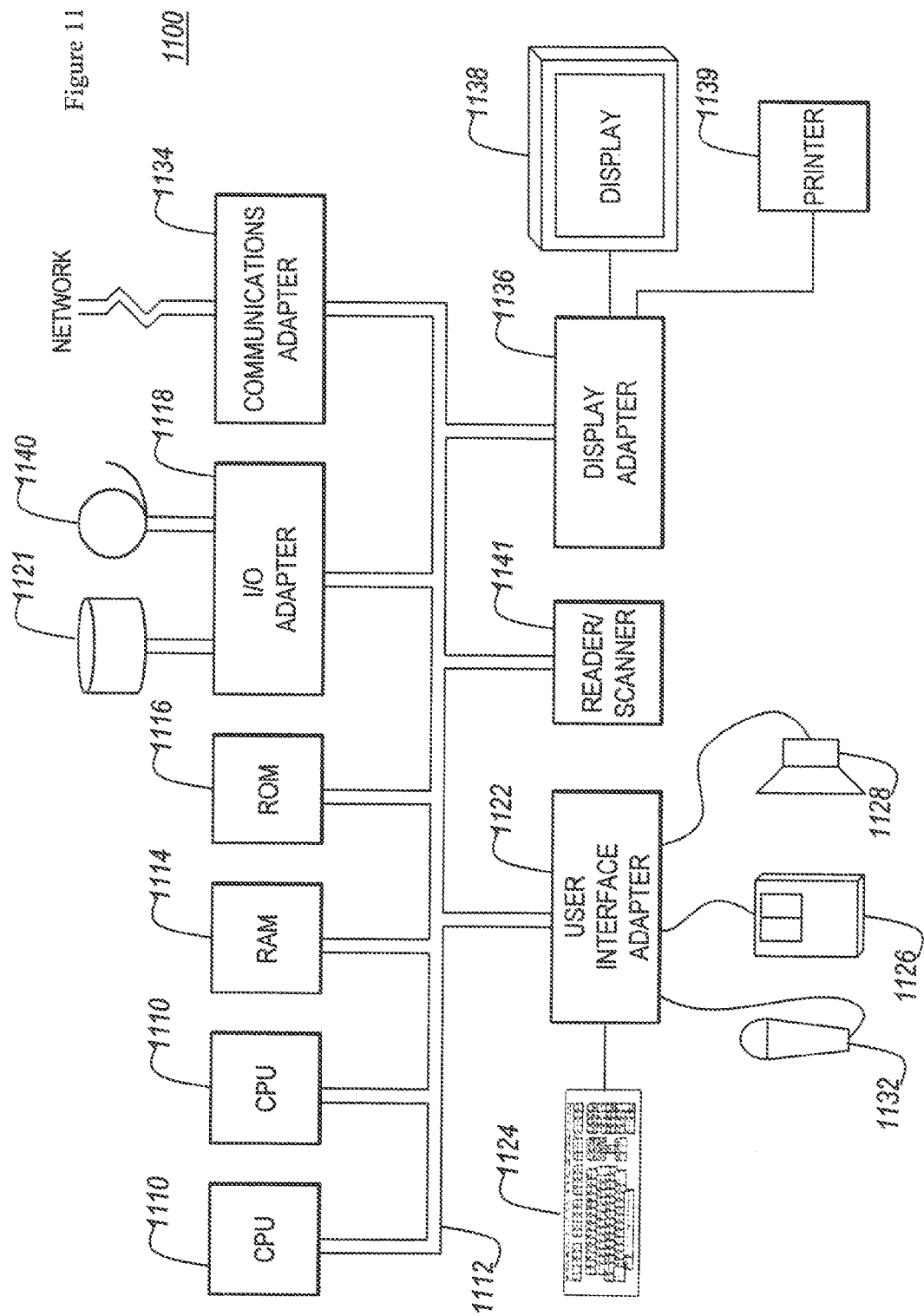
FIG. 11 illustrates an exemplary hardware configuration 1100 in accordance with the present invention.
Figure 12:
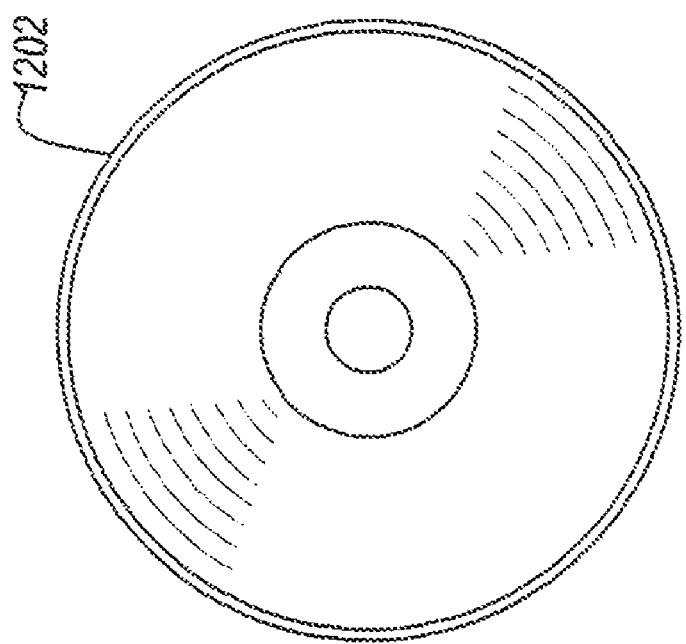
FIG. 12 illustrates exemplary signal-bearing media 1200 and 1202 in accordance with the present invention.
Figure 12:
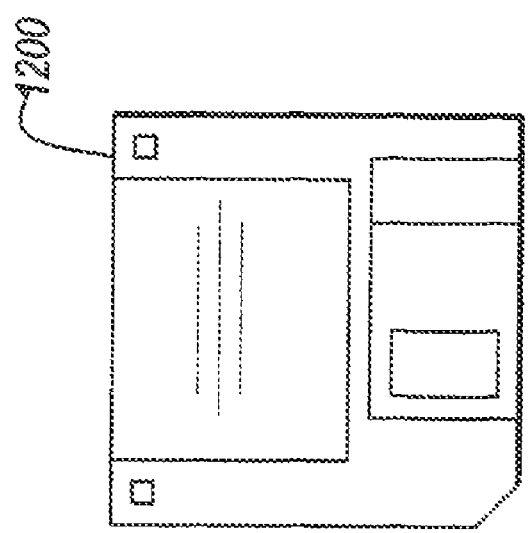

Referring now to FIG. 11, system 1100 illustrates a typical hardware configuration which may be used for implementing the inventive system and method for monitoring business performance using monitoring artifacts. The configuration has preferably at least one processor or central processing unit (CPU) 1110. The CPUs 1102 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, and Intranet, a personal area network (PAN), etc., and a display adapter 1136 for connecting the bus 1112 to a display device 1138 and/or printer 1139. Further, an automated reader/scanner 1141 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1110 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 410 and hardware above, to perform the method of the invention.

This signal-bearing media may include, for example, a RAM contained within the CPU 1110, as represented by the fast-access storage for example. Alternatively, the instructions may be contained in another signal-bearing media, such as a magnetic data storage diskette 1200 or CD-ROM 1202, (FIG. 12), directly or indirectly accessible by the CPU 1210.

Whether contained in the computer server/CPU 1110, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may comprise software object code, complied from a language such as "C," etc.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A monitoring artifact by which a system monitors business performance, the monitoring artifact comprising:
    a processor configured to process an incoming event using said monitoring artifact, said monitoring artifact comprising:
    a process model, as executed by a processor on a computer, that indicates a state of a monitoring process comprising at least one process for an input event of the monitoring artifact;
    an information model, as executed by said processor, that comprises at least one root data element containing an indicator of the state of said monitoring process;
    an access model, as executed by said processor, that determines an access for at least one user to said monitoring artifact; and
    a processor configured to adjust a monitoring infrastructure of said business performance based upon said processing.

2. The monitoring artifact of claim 1, wherein said at least one process comprises a correlating process that correlates an input event to a performance metric.

3. The monitoring artifact of claim 1, wherein said process model further indicates one of transitions between states, events that trigger state changes, guard conditions that verify if a trigger of a state change is valid, and actions associated with a transition between states.

4. The monitoring artifact of claim 1, wherein said indicator of the state of the monitoring process comprises performance indicators of the business performance.

5. The monitoring artifact of claim 1, wherein said monitoring artifact adjusts a business process based upon said monitoring.

6. The monitoring artifact of claim 1, wherein said at least one process comprises an evaluation step that evaluates a performance metric using a pre-determined metric.

7. The monitoring artifact of claim 1, wherein said at least one process comprises a detection step that determines whether said evaluation indicates a condition is satisfied.

8. The monitoring artifact of claim 1, wherein said at least one process comprises an alert process that alerts a user if a condition is satisfied.

9. The monitoring artifact of claim 8, further comprising a detect process to determine whether a predetermined contingency has been satisfied,
    wherein the alert process is triggered based upon the detection of the contingency by the detect process.

10. A system for monitoring business performance using a monitoring artifact, comprising:
    a processor configured to process an incoming event using said monitoring artifact, said monitoring artifact comprising:
    a process model, as executed by a processor on a computer, that indicates a state of a monitoring process comprising at least one process for an input event of the monitoring artifact;
    an information model as executed by said processor, that comprises at least
    an access model, as executed by said processor, that determines an access for at least one user to said monitoring artifact; and
    a processor configured to adjust a monitoring infrastructure of said business performance based upon said processing.

11. The system of claim 10, wherein said monitoring artifact comprises a stateful entity.

12. The system of claim 10, wherein said monitoring artifact comprises a process model, said process model comprising a model of the business process.

13. The system of claim 10, wherein said monitoring artifact comprises an information model, said information model comprising:
    historical information comprising information of past business processes; and
    current information comprising performance information of a current business process.

14. The system of claim 10, wherein said monitoring artifact comprises an access model, said access model comprising an interface to allow a user to access the monitoring artifact.

* * * * *